United States Patent [19]

Frick

[11] Patent Number: 4,586,108
[45] Date of Patent: Apr. 29, 1986

[54] CIRCUIT FOR CAPACITIVE SENSOR MADE OF BRITTLE MATERIAL

[75] Inventor: Roger L. Frick, Chanhassen, Minn.

[73] Assignee: Rosemount Inc., Eden Prairie, Minn.

[21] Appl. No.: 660,395

[22] Filed: Oct. 12, 1984

[51] Int. Cl.[4] .......................... H01G 7/00; G08C 19/10
[52] U.S. Cl. .................................. 361/283; 340/870.37
[58] Field of Search ................. 340/870.37; 29/25.41; 361/283; 73/706, 708, 718, 724

[56] References Cited

U.S. PATENT DOCUMENTS 4,398,194 8/1983 Johnston ..................... 340/870.37

OTHER PUBLICATIONS

Behr, M. and J. Giachino, A Miniature Pressure Sensor for Automotive Applications, I Mech E. Conference Publications 1981-10 (1981), presented at The Third International Conference on Automotive Electronics at London in 10/1981.

MKS Instruments, Inc., Instruction Manual for MKS Baratron ® Type 22A Pressure Gauge, Apr. 1979, pp. 3-1 to 3-3.

Primary Examiner—Donald A. Griffin
Attorney, Agent, or Firm—Kinney & Lange

[57] ABSTRACT

Sensor circuitry for sensing changes in capacitance of separate sensor portions wherein in each of the sensor portions a separate plate will deflect in response to changes in parameter, for example changes in pressure, to thereby provide an output that relates to differential pressure. The specific example is in connection with sensor portions which are fluid filled and in fluid communication with each other so that a deflection of a plate on one of the sensor portions causes an opposite deflection of a plate on the other sensor portion. The circuitry provides a stable output regardless of some variation in sensor characteristics. Temperature induced variations in the dielectric constant and density of the fluid filling the sensor portions may all be compensated for in the circuitry. Preferably CMOS logic devices that provide a signal which exhibits a direct relationship to capacitive loading are used. The signal is sensed to modify the voltage applied to the CMOS device to achieve a desired relationship. The voltage or current output from the capacitors indicates the capacitive values of the sensor.

24 Claims, 5 Drawing Figures

CIRCUIT FOR CAPACITIVE SENSOR MADE OF BRITTLE MATERIAL

CROSS REFERENCE TO RELATED APPLICATIONS

Reference is made to my copending application, Ser. No. 660,396, assigned to the same assignee as this application, filed on Oct. 12, 1984 and entitled "Capacitive Sensing Cell Made of Brittle Material", and the copending application of Thomas A. Knecht et al, Ser. No. 660,394, filed on Oct. 12, 1984 and entitled "Pressure Sensing Cell Using Brittle Diaphragm".

BACKGROUND OF THE INVENTION

1. Field of the Invention

The present invention relates to capacitive sensing circuitry for use with indicating differential pressure sensed by two sensor portions which are fluid filled and in fluid communication with each other.

2. Description of the Prior Art

In the prior art various capacitive sensing circuits have been advanced. Further, various sensors have been advanced for sensing differential pressure in response to deflections of separate diaphragms where a deflection in one direction of one of the diaphragms will cause an opposite deflection of another diaphragm because of a substantially incompressible fluid transferring the diaphragm motions to each other. For example, U.S. Pat. No. 4,398,194 shows such a sensor.

This device shows fairly flexible diaphragms mounted on opposite ends of a single block, and a circuitry for correcting span errors induced by changes in the density of the filling fluid as a function of temperature changes. This device, however, requires that the diaphragms be closely matched in stiffness in order to minimize zero errors induced by changes in fill fluid density.

Many circuits for providing the necessary output signals incorporate complex temperature compensating circuits that require costly temperature cycling and adjustment procedures. The problems of providing a simplified circuit which compensates for both zero and span errors without costly temperature cycling have limited usages of the oil filled, double diaphragm differential pressure sensors. The present invention teaches the solution to such problem when using double diaphragm capacitive sensors in which the diaphragm to capacitor plate spacing is substantially zero before oil filling.

SUMMARY OF THE INVENTION

The present invention relates to capacitive sensing circuitry for differential pressure sensors. The sensing circuitry relies on a minimum number of precision components and provides desired reliable outputs indicating changes in capacitance between two oil filled sensor portions, each of which has at least one deflecting diaphragm forming one capacitor plate which moves relative to a second plate, and wherein the deflection of the diaphragm in one sensor portion causes an opposite deflection of the diaphragm of the other sensor portion.

Fluid filled chambers are formed in each sensor portion as the diaphragms are bowed under the oil filling pressure. The diaphragm spacing in each sensor portion is a function of the pressure of the oil filling in that the spacing of the diaphragm and the second capacitor plate of each sensor portion is zero (the plates are in contact) when the fill pressure is zero. ($X = 0 @ p_{fill} = 0$).

Conventional capacitance measuring circuits will give outputs that are a function of oil density and dielectric which in turn are a strong function of temperature when used with the above described type of sensor. In addition to span errors due to density or dielectric changes in the fill oil of ±6%/100° F. because of temperature changes, large zero errors will result unless the diaphragms of the sensor portions are precisely matched.

The present invention provides temperature dependent span compensation, either by measuring the sensor temperature and adjusting the circuit excitation or output as a function of temperature or by deriving a function of $C_1$ and $C_2$ (the capacitance of the respective sensor portions) which indicates temperature changes. Changes in density of the oil with temperature affect the dielectric constant and change the capacitor plate spacing of both sensor portions in the same direction. That is, both spacings increase or decrease simultaneously with temperature shifts.

Zeroing is accomplished by providing a function of the differential capacitance between $C_1$ and $C_2$ and setting the output equal to zero at zero differential pressure on the two sensor portions.

The transfer function for the differential pressure sensors of the type disclosed show that by providing an output related to a multiplication of the zeroing function and span correction function, reliable results are obtained even when the diaphragm deflection characteristics (stiffness factors) are not precisely matched. Thus, reduced sensor manufacturing costs are possible.

The analog circuits described in this application solve these problems and result in low span and zero errors when adjusted properly, even if diaphragms of the sensor portions are not matched. A zeroing circuit which responds to the capacitance detector excitation, and a span compensation circuit to correct the excitation for changes in oil dielectric or density are provided in the present invention. When the zeroing circuit is adjusted for zero output at zero differential pressure, errors will be minimized. This differs from conventional circuits where span compensation is applied to the capacitor excitation before zeroing and the zeroing circuitry has a separate excitation signal that is fixed.

The compensation functions also work in digital systems. In such systems $C_1$ and $C_2$ are independently measured and converted to digital numbers ($N_1$ and $N_2$). The transfer functions disclosed herein are implemented mathematically with a micro-computer as for example:

$$N_{out} = N_1(T) \left[ \frac{N_1 - N_2}{N_1 + N_2} - A \right]$$

where $N_1(T)$ is a number derived by measuring temperature or by calculating it from $N_1$ and $N_2$ values. A is a number chosen to provide substantially zero output when the pressure differential is zero on the sensor.

In one form a simplified circuit utilizes CMOS circuitry to excite a capacitance bridge, wherein the CMOS circuit current is sensed to provide an output. A feedback resistor senses a current proportional to the signal being sensed, which gives an accurate indication of the capacitive load. The drive current of the CMOS device is sensed in that the drive current is proportional to the capacitive load on its output. The signal from a current sensing resistance modifies the excitation voltage of a capacitance bridge including the sensing capacitors. The output of the bridge, is an AC signal that is a function of the series capacitance of the sensors and also a function of the differential capacitance between the two sensing capacitors. A suitable zeroing circuitry is provided by passing the output from the bridge through a rectification circuit and then into a resistance network which is excited by a DC potential proportional to the AC bridge excitation. This provides zeroing capabilities so that the sensor portions, and thus the capacitances of the respective sensor portions, do not have to be perfectly matched across the span of temperature. The resultant output is then used to provide an indication of the parameter (pressure) being sensed.

That circuitry gives a span compensation for temperature changes in that the dielectric constant of the oil used for filling the sensor portions is related primarily to the oil density, which in turn is related to sensor temperature and is independent of pressure, so that the changes in series capacitance being sensed provides a reliable compensation signal for the pressure being sensed.

In another form, the values of the sensor capacitors are each used to control the product of an oscillator, and the output currents driving the sensor capacitors are compared to provide an output signal.

DETAILED DESCRIPTION OF THE PREFERRED EMBODIMENTS

Figure 1:
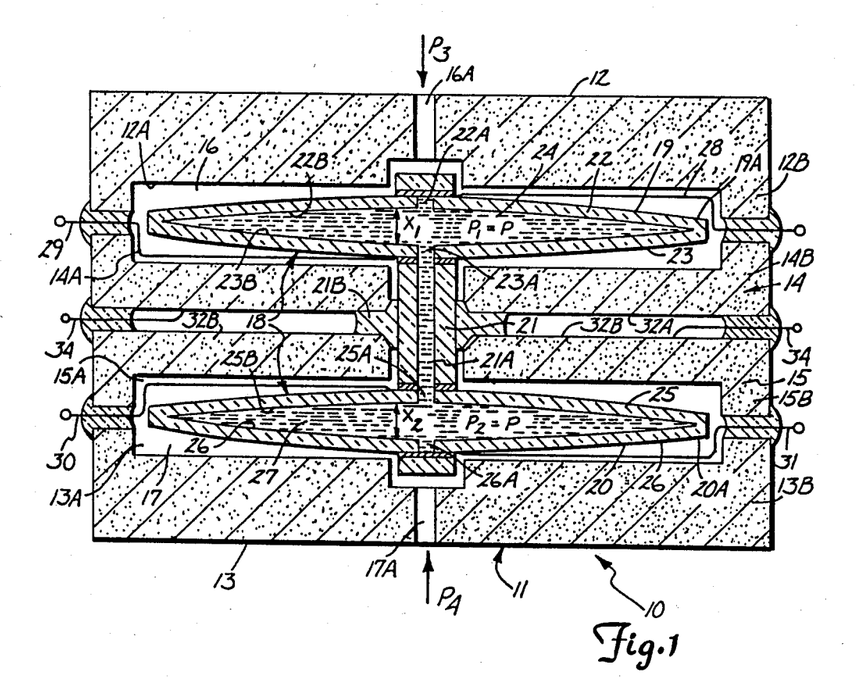
FIG. 1 is a part schematic representation of a typical pressure sensor of a design which is utilized with the circuitry of the present invention.

In FIG. 1, a pressure sensor assembly indicated generally at 10 includes an outer housing 11, which has a first end section 12, a second end section 13, and center sections 14 and 15, respectively. Each of the housing sections 12, 13, 14 and 15 have recesses 12A, 13A, 14A, and 15A, respectively defined therein by annular rims 12B, 13B, 14B and 15B. As shown in the recesses are generally circular in plan view and the recess 12A faces the recess 14A and the sections are fused together with a glass layer between rims 12B and 14B. The recesses together form a first interior pressure chamber 16. The housing section 12 has a passageway indicated at 16A leading into the chamber 16.

The recesses 13A and 15A are open to each other to form a second interior pressure chamber 17 and the rims 13B and 15B are fused together with a glass layer to form the chamber 17. A passageway 17A is defined through the housing section 13 to chamber 17.

The sub-assemblies of the housing sections 12 and 14, and 13 and 15, respectively, are held together to form the housing at a center portion by an annular layer of glass fused to the facing surfaces of the housing sections 14 and 15 adjacent the outer periphery thereof.

A pressure sensor element indicated generally at 18 is mounted in the housing 10, and the sensor element 18 includes a first sensor element portion 19 that is mounted in the chamber 16. A second sensor element portion 20 is mounted in the chamber 17. A connecting conduit 21, forms a support pedestal used for supporting and joining the first and second sensor element portions 19 and 20. The sensor element 18 therefore comprises the assembly of the two sensor element portions 19 and 20 and the pedestal 21 that joins them.

In detail, each of the sensor element portions comprises a pair of deflecting plates of substantially uniform thickness, as shown, and of suitable size. The plates 22 and 23 form the sensor portion 19. Plates 22 and 23 are fused (sealed) together at their outer edges or rim portions indicated at 19A. The junction and seal at the rim portions 19A defines a closed interior chamber 24 between the plates 22 and 23.

The sensor element portion 20 comprises a pair of flat plates 25 and 26, respectively, which are preferably constructed identically to the plates 22 and 23. The plates 25 and 26 are fused together and sealed at their outer peripheral edges of rim portions shown at 20A to define a second sealed chamber 27 between the plates 25 and 26.

In the form of the sensor shown, the sensor element portion plates 22 and 23, and 25 and 26 are made of a suitable brittle material such as a ceramic material, silicon, glass, saphire, or quartz. The brittle material has low tension carrying capability and generally fractures before it yields under tension loading. A material with maximum tensile stress of 1,000 psi to 50,000 psi at failure is considered brittle when it has no well defined yield point. However, such materials have excellent compression carrying capabilities and the compression strength is much greater than the tensile strength. The plates are formed to be of substantially uniform thickness across their entire diameter. The pedestal or conduit 21 is formed of a similar material and has an interior passageway 21A so that the conduit 21 is a tubular conduit of brittle (rigid) material.

Each of the plates 22, 23, 25 and 26 has a center hole therein when initially formed, at the central axis of the plate, that is an axis in the center and perpendicular to the general plane of the plate at rest. Such openings or holes are shown at 22A, 23A, 25A and 26A, respecctively.

The pedestal or conduit 21 is connected to the plates 23 and 25 through the use of a fused glass layer where the pedestal or end joins the plates. The glass layers surround the holes in the abutting plates and thus the chambers 24 and 27 are open to the passageway 21A.

The pedestal conduit 21 forms a support for the sensor elements so that the plates 22, 23, 25 and 26 are held on the conduit 21 in a rigid assembly, yet the sensing elements are substantially isolated from stresses and strains in the housing. A layer of glass 21B is fused around the outer surface of the conduit 21 and to surfaces of the housing sections 14 and 15. The chambers 16 and 17 of the respective housing sections 14 and 15 are thus fluidly isolated from each other.

Prior to assembly into the sensor element portions each of the plates 22, 23, 25 and 26 is provided with a layer of electrically conductive material shown at 22B, 23B, 25B and 26B respectively. The layers may be a thin film deposited on the brittle material plates. The layers form capacitor plates or electrodes and are electrically insulated from each other. Each of the electrically conductive layers extends around the surfaces forming the respective openings 22A, 23A, 25A and 26A and the conductive layers also extend a short distance around the respective opening on the outside of the plates after the chambers are formed. The layer of conductive material on the outside surfaces of the plates forms a place for conductors or leads to be connected to the capacitor electrodes.

A lead 29 is connected to the layer 22B adjacent to the opening 22A. The opening 22A is closed with a suitable cap fused in place with a suitable glass layer as shown, which also holds the conductor 28 in position. A second conductor or lead 29 is connected to the layer 23B adjacent opening 23A. A third conductor or lead 30 is connected to layer 25B adjacent opening 25A, and a fourth lead 31 is connected to layer 26B adjacent the opening 26A. A cap is sealingly held over opening 26A with a fused glass layer. The chambers 24 and 27 are thus hermetically sealed, but are open to each other through the interior passageway 21A of the rigid conduit or pedestal 21. At assembly the plates of each sensor are substantially in contact, and a filling of oil in the chambers 24 and 27 under an initial pressure (p) causes the initial spacing of the plates forming the chambers.

The facing surfaces of the housing sections 14 and 15 form a chamber 32, have layers of conductive material thereon indicated at 32A and 32B, respectively, and these layers form electrodes for a reference capacitor ($C_3$). The facing surfaces formed between the housing sections 14 and 15 may be spaced to provide this reference capacitance. The chamber 32 will hold a reference pressure that can be measured by the plates 32A and 32B operating through suitable leads 34. Additionally, if one or both of the surfaces carrying the layers 32A and 32B can be used for location of a temperature sensor to determine the temperature for compensation purposes or for other purposes.

In analyzing the equations that are effective in describing the operation of the sensor assembly, the first sensor element portion 19 will be designated with a subscript "1" and the second sensor element portion 20 will be designated with a subscript "2". The pressure inside the sensor element portion 19 will be designated $P_1$ (see FIG 1), and any spacing shift between the two surfaces forming the sensing plates in the form shown will be designated $X_1$. The pressure in the chamber of the second sensor portion it will be $p_2$, and the spacing of the plates of the second sensor element portion 20 will be $X_2$. Likewise, capacitance indications will be $C_1$ and $C_2$, respectively, for the two sensor element portions.

In considering the operation of the sensor, and its analysis, the pressure in chamber 21 which houses the first sensor element portion will be considered to be $p_3$ (FIG. 1) and the pressure in the chamber 17 acting on the second sensor element portion 20 will be $p_4$. Normally, the measured quantity will be $\Delta p = p_3 - p_4$. As was stated, when the plates or diaphragms are assembled so that they are in contact on both sensor element portions at zero pressure on the interior, that is, $p_1$ equals zero equals $p_2$ equals zero. Then $X_1$ and $X_2$ also equal zero. When the chambers under the diaphragm are filled with fluid, each capacitor formed will have a spacing X and the stiffness of the sensor element portions, each comprising the assembly of two plates, will be a constant that will described the deflection of the plate under external pressures. Thesse constants are $K_1$ for the first sensor element portion and $K_2$ for the second sensor element portion.

The deflection of only one plate of each assembled pair relative to the other will provide a useful signal. Thus, one plate can be a rigid and nondeflecting base.

After an oil fill the sensor element will assume the position as shown in FIG. 1 with $p_3 = p_4$. The spacing of the facing surface of the plates of each sensor portion represented at $X_1$ and $X_2$ is substantially equal and equals $X_o$. The plates only are subjected to modest bending stresses. The filling of the substantially incompressible fluid will expand or contract slightly on temperature changes, but this will not overstress the plates. It should be noted that the spacing and curvature of the plates has been grossly exaggerated in the present drawings. The full scale spacing of the plates is extremely small.

Under a condition of normal full scale differential pressure, the deflection $X_1$ for the first chamber 24 is less than the deflection $X_2$, meaning that the pressure on the sensor portion 19 is greater than on the sensor portion 20. The deflection of the plates 25 and 26 results in moderate bending stresses at full scale operation. Preferably $$X_1 = \frac{X_o}{2} \text{ and } X_2 = \frac{3}{2} X_o.$$

at $\Delta p = $ full scale pressure.

In an extreme overpressure condition wherein the plates 22 and 23 are in contact across substantially their entire surfaces ($X_1 = 0$), and all of the incompressible fluid is forced into the interior passageway of the conduit and into chamber 27. Because the volume of the fill fluid or oil is controlled, the plates 25 and 26 are not excessively stressed in bending ($X_2 = 2X_o$), and the overpressure condition on the plates 22 and 23 results in substantially pure compression of those plates. The pressure tends to compress the facing surfaces of the plates together, and because the brittle material can withstand a substantial amount of compressive stress, there is no danger of damaging the sensor element, or the plates forming the sensor element.

Thus, the ability to withstand exceedingly high overpressure is present, and the use of a brittle material for the plates keeps the size small, costs down, and lends itself well to batch processing of the thin film coatings for the electrodes of the capacitive sensing means as well as permitting accuracy.

The sensing element design is suitable for brittle materials and incorporates integral bidirectional overload protection for pressures up to several thousand psi which are encountered in industrial flow measuring applications. When the chambers are filled with oil and $p = 0$ the sensor element portion experiences modest bending stresses (tension and compression) which do not exceed the tensile strength of the materials used. Normal pressure excursions do not exceed 1.5 times this initial stress. Overload conditions in either direction bring one of the diaphragms or plate assemblies back to the initial condition where bending stresses are zero and further pressure results in pure compression (which brittle materials are known to withstand). The other diaphragm assembly experiences maximum bending stresses which are limited to two times the initial stress.

It should again be noted that in the drawings the plate spacing and bending conditions are greatly exaggerated, and the amount of spacing between the plates in operation is extremely small. However, changes in the spacing can be sensed accurately, due to the capacitive sensing features.

Chamber 32 formed between the housing sections has a reference pressure in it but may be affected by the levels of pressure $p_3$ and $p_4$ (see FIG. 1) which cause deflection of the facing surfaces of the housing. The spacing of electrodes 32A and 32B is thus a function of the static pressure level, which is:

$$\frac{p_3 + p_4}{2}$$

The electrodes 32A and 32B will provide a capacitance signal $C_3$ that will permit compensating the signals $C_1$ and $C_2$, which indicate differential pressure, for differences in static or line pressures at the same differential in pressure. Capacitance sensing is desirable because of the extremely small deflections or movements involved.

In a complete analysis of the requirements for sensing the spacing between the diaphragms or plates in each of the sensor portions, where there are two chambers formed, and each of the chambers comprises a pair of brittle diaphragms sealed at their edges to form interior chambers and having an oil fill, as shown, there are a number of factors that have to be taken into account, including the temperature, which affects the oil density and hence its volume, the modulus of elasticity of the diaphragm material, the diaphragm thickness, and the diaphragm diameter.

In order to determine the necessary equations for sensing the spacing differences, particularly in capacitive sensing, an analysis of the plate deflection under differential pressures is necessary. Assuming that a sensing cell is made as shown in FIG. 1, each of which comprises two diaphragms defining individual chambers (chambers 1 and 2) with the chambers of the individual diaphragm assemblies connected together by a conduit 21 and filled with oil, the spacing between the diaphragm plates of each sensor portion is designated as X ($X_1$ is the first portion and $X_2$ is the second); the pressure acting on the exterior of the first sensor portion in chamber 16 is designated as $p_3$, and the pressure acting on the exterior of the second sensor portion in chamber 17 is designated as $p_4$. The internal oil pressures are designated as "p", that is $p_1$ for the first chamber and $p_2$ in the second chamber, which are equal in normal operation ($p_1 = p_2 = p$), and the stiffness factors of the respective sensor portions are designated as $K_1$ and $K_2$, respectively.

The stiffness factors are constant terms that can be determined by the construction of the plates or diaphragms, including modulus of elasticity, diameter and thickness of the diaphragms. Desirably $K_1$ will equal $K_2$, if the sensor portions are identical, but that is difficult to insure without precise manufacturing control and detailed check out, and thus it is expensive to insure identical sensor portion properties during manufacture.

Additionally, in the system shown when there is no oil filling that is, internal $p=0$, the plates are assumed to be substantially in contact, as previously explained, and the plate spacing (X) is substantially zero or in other words $X_1(@p=0) << X_o$ where $X_o$ is the spacing after introduction of the oil fill, and $X_1 = X_2 = 0$. With the quantities as defined above including the stiffness factor of the plates, the following relationships are established:

$$X_1 = X_2 = 0 @ p = 0$$

With proper selection of the K terms for the pressure range desired, it is derived:

$$X_1 = K_1 (p - p_3)$$

$$X_2 = K_2 (p - p_4)$$

A first possible transfer function for relating $X_1$ and $X_2$ to differential pressure is:

$$Z_1 = X_1 - X_2 = K_1 p - K_2 p + K_2 p_4 - K_1 p_3 \quad (1)$$

$$Z_1 = p(K_1 - K_2) + K_2 p_4 - K_1 p_3$$

$$Z_1 = p(K_1 - K_2) @ p_4 = p_3 = 0$$

Note that this quantity depends on p, which will vary with temperature as the oil fill expands. This is not desirable and results in a large zero coefficient, unless $K_1 = K_2$. Making $K_1 = K_2$ precisely is very costly and usually impractical because of manufacturing tolerances. Thus, this scheme is not suited for applications where the temperature varies unless costly temperature schemes are added to the device.

A second possible transfer function is:

$$Z_2 = \frac{X_1 - X_2}{X_1 + X_2}$$

or using capacitive sensing as previously described, $$Z_2 = -\frac{C_1 - C_2}{C_1 + C_2}$$

These last two quantities are equivalent if C is $\propto 1/X$. By combining equations it is shown:

$$Z_2 = \frac{K_1 p - K_2 p}{K_1 p + K_2 p} = \frac{K_1 - K_2}{K_1 + K_2} @ p_3 = p_4 = 0$$

Note that this is independent of $p@p=0$ so that this transfer function (2) above exhibits excellent zero stability even if $K_1$ is not equal to $K_2$ and better performance is thus realized with lower manufacturing costs.

In analyzing equation (2), it is noted that the transfer function results in span errors since the output is proportional to the quantity $1/(X_1 + X_2)$ and $X_1 + X_2$ is directly related to the expansion and contraction of the oil fill of the sensor sections at different temperatures.

Further analysis shows:

$$Z_2 = \frac{K_1(p - p_3) - K_2(p - p_4)}{K_1(p - p_3) + K_2(p - p_4)}$$

which equals $$\frac{p(K_1 - K_2) + K_2 p_4 - K_1 p_3}{p(K_1 + K_2) - K_2 p_4 - K_1 p_3}$$

which equals $$\frac{(p_4 - p_3) K_1}{p \times 2K_1 - K_1 p_4 - K_1 p_3}$$

if $K_1 = K_2$ which equals $$\frac{p_4 - p_3}{2p - (p_4 + p_3)}$$

For purposes of sensing differential pressures in the range normally desired, oil can be considered to be incompressible, and therefore:

$$p = p_0 + \frac{p_4 + p_3}{2}$$

when $P_o$ is the initial fill pressure of the two chambers. The quantity $$\frac{p_4 + p_3}{2}$$

is the static line pressure on the differential pressure sensor.

Then, the following relationship can be established:

$$Z_2 = \frac{p_4 - p_3}{2p_0 + p_4 + p_3 - p_4 - p_3} = \frac{p_4 - p_3}{2 p_0} = \frac{\Delta p}{2p_0}$$

This indicates that the output from a capacitive sensor mounted on the individual sensor portions is directly proportional to the quantity $1/p_0$ where $p_0$ is the pressure generated by the oil fill. The quantity $p_0$ varies at about six percent per 100° F. because of the expansion coefficient of oil used in sensors, which is usually a silicone oil. Thus, the transfer function $\Delta p/2p_0 = Z_2$ has no zero temperature coefficient at zero $\Delta p$, but it has a span temperature coefficient of six percent per 100° F. due to oil density (and thus volume) changes with temperature. Thus, this transfer function is also not suitable for applications where the temperature varies unless costly temperature compensation techniques are included in the design.

A preferred way of deriving the differential pressure signal solves the problems associated with (1) and (2). Constants $K_1$ and $K_2$ are set equal to $1/K_1'$ and $1/K_2'$, respectively. Then the output from the sensors can be analyzed as follows:

$$Z_3 = K'_1 X_1 - K'_2 X_2 \quad (3)$$

Substituting the $1/K$ factors, and the values for $X_1$ and $X_2$ stated in the original analysis the equation is as follows:

$$Z_3 = \frac{X_1}{K_1} - \frac{X_2}{K_2} = \frac{K_1(p - p_3)}{K_1} -$$

$$\frac{K_2(p - p_4)}{K_2} = p - p + p_4 - p_3$$

$$Z_3 = p_4 - p_3 = \Delta p$$

The equation (3) above for indicating differential pressure is totally independent of p, the fill pressure, and the match between $K_1$ and $K_2$.

Thus using this equation as a basic function, the circuit constants $K_1$ and $K_2$ are adjusted for $Z_3 = 0$ at $\Delta p = 0$. The output from the sensor will then exhibit no zero or span errors caused by oil expansion or contraction even if the diaphragm assemblies are mismatched within normal manufacturing tolerances. Thus, the zero temperature coeefficient and the span temperature coefficient effect on the circuit output will be zero due to fill oil expansion.

Equation (3) above is not directly suitable for use with capacitance measurement since capacitance is related to both dielectric constant e and spacing X ($C \propto e/X$). However, by making measurements that can be used to calculate oil density, equation (3) can be put in form which is suited for capacitive measurement circuitry.

Sensor series capacitance is equal to:

$$C_s = \frac{C_1 \times C_2}{C_1 + C_2}$$

This capacitance ($C_s$) can be shown to be:

$$C_s \alpha \frac{e}{X_1 + X_2}$$

since $$C_1 = \frac{Ke}{X_1} \text{ and } C_2 = \frac{Ke}{X_2} \text{ and}$$

$$\frac{C_1 \times C_2}{C_1 + C_2} = \frac{\frac{Ke}{X_1} \times \frac{Ke}{X_2}}{\frac{Ke}{X_1} + \frac{Ke}{X_2}} = \frac{Ke}{X_1 + X_2}$$

where e is the dielectric constant of the oil, the quantity $C_s$ can further be shown to be almost exclusively dependent on the density of the fill fluid. Since e is normally directly proportional to oil density and the quantity $X_1 + X_2$ is inversely proportional to density of the fixed amount of oil in the diaphragm assembles it can be seen that:

$$C_s \alpha \frac{e}{X_1 + X_2} \alpha \frac{\sigma}{\frac{1}{\sigma}} \alpha \sigma^2 \alpha e^2$$

since $e \propto \sigma$ where $\sigma =$ oil density. Thus, $e \propto \sigma \propto \sqrt{C_s} \cong C_3 + C_4$ where $C_A \cong C_s$. Thus, $C_s$ can be measured with appropriate circuitry and used to compensate for errors caused by changes in oil density with temperature.

The function $C_A + C_s$ is a function of oil density. If $C_A$ is selected to approximately equal to $C_s$ then, the quantity $C_A + C_s$ will vary by about 6 percent per 100° F. and compensate for oil density changes. This can be seen by noting that $C_s$ will change about 12 percent per 100° F., since $C_s \propto \sigma^2$. Thus, if $C_A \cong C_s$ the quantity $C_A + C_s$ will change about 6 percent per 100° F.

Using these relationships $Z_3$ can be put into the form $Z_4$ as shown below; the quantities $$C_R = \frac{C_2 - C_1}{C_1 + C_2} \text{ and } \frac{1}{C_1} + \frac{1}{C_2} = \frac{1}{C_s}$$

can be measured with suitable circuitry. Changing the equations to express change in spacing in terms of $C_1$ and $C_2$, it can be shown:

$$Z_4 = K'_3(C_R - A) \frac{1}{C_s} e =$$

$$K'_3 \left( \frac{C_1 - C_2}{C_1 + C_2} - A \right) \left( \frac{1}{C_1} + \frac{1}{C_2} \right) e$$

$$= K'_3 \left[ \frac{X_1 - X_2}{X_1 + X_2} - A \right] \left[ \frac{X_1}{K_4} + \frac{X_2}{K_4} \right]$$

$$= \frac{K'_3}{K_4} [X_1 - X_2 - A(X_1 + X_2)]$$

when $$C_1 = \frac{K_4 e}{X_1} \text{ and } C_2 = \frac{K_4 e}{X_2}$$

and e is the dielectric constant of the oil fll. Then, Constants A and $K_3/K_4$ are set to fulfill the following:

$$A = \frac{K_1 - K_2}{K_1 + K_2} \text{ and } \frac{K_3}{K_4} = \frac{K_1 + K_2}{2K_1K_2}$$

The above equation will then be resolved into the following form:

$$Z_4 = \frac{K_1 + K_2}{2K_1K_2} \left[ X_1 - X_2 - \frac{K_1 - K_2}{K_1 + K_2} (X_1 + X_2) \right] \text{ equals}$$

$$\frac{K_1 + K_2}{2K_1K_2} (X_1 - X_2) - \frac{K_1 - K_2}{2K_1K_2} (X_1 + X_2) = \frac{X_1}{K_1} - \frac{X_2}{K_2}$$

The end equation $X_1/K_1 - X_2/K_2$ is the same as the equation for $Z_3$ above, which indicates here should be no zero temperature coefficient or span temperature coefficient errors on the output due to the expansion and contraction of the fill oil in the chambers.

Alternate forms of $Z_4$ that are suited to particular circuits are:

$$Z_4 \propto (C_R - A) \sqrt{\frac{C_s}{C_s}} \propto (C_R - A) \frac{1}{\sqrt{C_s}} (C_R - A) \frac{1}{C_A + C_s}$$

since $e \propto \sqrt{C_s}$ and $\sqrt{C_s} \approx C_A + C_s$ where $C_A \approx C_s$.

Figure 2:
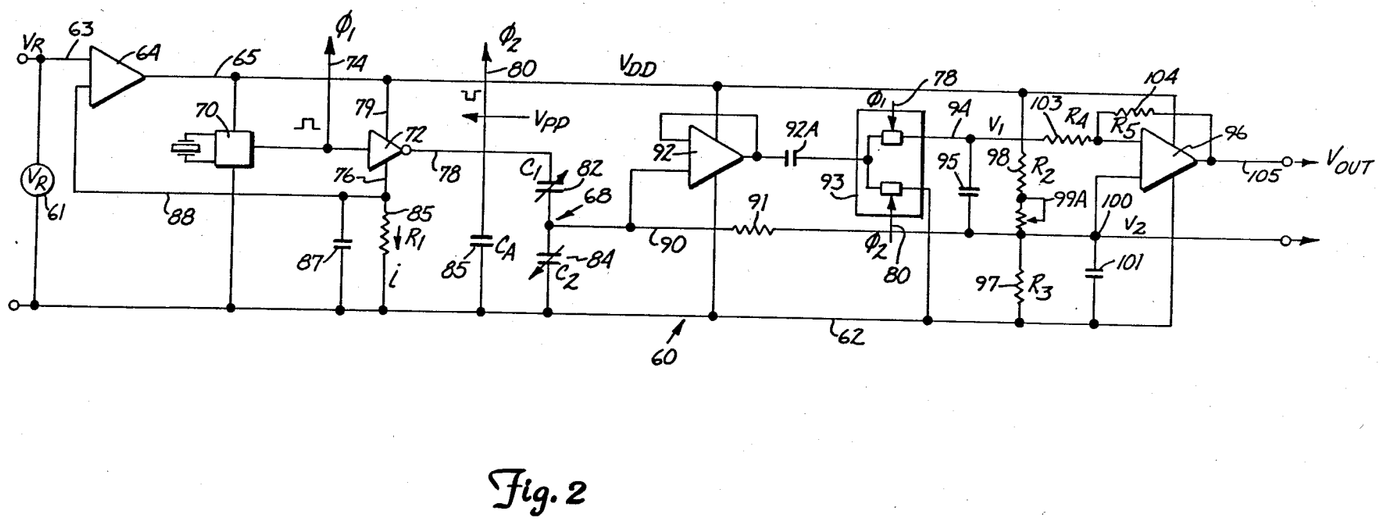
FIG. 2 is a simplified schematic of a basic sensing circuit according to the present invention.

The circuit shown in FIG. 2 implements the transfer function $Z_4$ in its first shown form. The circuit indicated generally at 60 for providing a signal output from a brittle diaphragm sensor such as that shown in FIG. 1 includes a voltage reference indicated schematically at 61 that provides a stable reference voltage in a conventional manner, sucb as with a Zener diode or other suitable reference voltage source. Reference voltage source 61 is connected across a circuit common line indicated at 62 and an input line 63 of one input of a operational amplifier 64 of suitable design. The operational amplifier 64 controls a supply voltage to CMOS and another analog circuitry, so that the supply voltage on the output line indicated at 65 from the operational amplifier is made proportional to the current that flows through the capacitance sensor network indicated generally at 68 and designated $C_1$, $C_2$ and $C_A$. The supply voltage $V_{DD}$ on line 65 is connected to power a crystal controlled osciallator 70 which provides a square wave output on a line 73 that drives a CMOS inverter or gate 72. Additionally, a pulse signal $\phi_1$ is provided on a line 74. The inverter 72 is a typwe 4069 CMOS inverter, which has the characteristic that the current consumed in line 76 is proportional to the capacitive load on the output line 78 of the inverter. The inverter 72 is also connected to power with a line 79 to the voltage supply line 65.

The output line 78 carries the inverted signal from line 73 and a signal line 80 is provided for carrying this inverted pulse signal ($\phi_2$).

Line 78 is connected to a series connection of $C_1$ and $C_2$, (the sensor capacitors) which are indicated by numerals 82 and 84, respectively, and a parallel capacitance $C_A$ indicated at 85 is included to form the capacitance network 68 on the output side of the inverter 72. These capacitances then in turn are connected to the circuit common line 62. $C_1$ and $C_2$ may be the respective capacitances of the sensor portions oF FIG. 1.

Current in line 76 is sensed by resistor 85($R_1$) connected from line 76 to circuit common 62, and a capacitance 87 is connected in parallel with the resistor 85 from a line 88 that leads to the second input of the operational amplifier 64, so that the output signal on line 65 is a function of differentials between the voltage sensed at line 88 (dependent on the current in line 76) and the voltage supplied by the reference voltage source 61 on line 63.

The current consumed by the inverter72 in line 76 is a DC current and thus resistor 85 provides a DC voltage on line 88 that can be sensed as a feedback for establishing the operating voltage on the line 65. A zeroing circuit is incorporated in FIG. 2, to substantially provide the output of:

$$[C_R - A] \left[ \frac{1}{C_1} + \frac{1}{C_2} \right] e = (C_R - A) \frac{e}{C_s}$$

which has been shown to be equivalent to Equation 3 which is the preferred transfer function for maximum accuracy.

The above can be shown through the following circuit analysis. A line 90 carries an AC signal from oscillator 70, and is connected between capacitors 82 and 84 ($C_1$ and $C_2$), and a large value bias resistor 91 is connected in line 90. A buffer amplifier 92 senses the signal on line 90, and the output of buffer amplifier 92 is an AC signal that is passed through a capacitor 92A into the input of a CMOS 4016 transmission gate 93 that acts as a rectifier, and is triggered on each phase of the AC signal from the lines 74 and 80, respectively. The gate 93 is connected to provide a rectified voltage on an output line 94. This voltage is designated $V_1$. The second output of the CMOS rectifier gate 93 is connected to circuit common 62 through a suitable line. A filter capacitor 95 is connected between line 94 and line 90.

The voltage on line 94 is a DC voltage which is a function of the voltage on line 65 and the output of the capacitance network. This signal $V_1$ is provided before zeroing and represents substantially the output of the FIG. 2 circuit.

The zeroing circuit comprises a DC zeroing network to subtract out a voltage that zeroes the output when the differential in pressure sensed by $C_1$ and $C_2$ equals zero. An operational amplifier 96 is used to measure the difference between the voltage on line 94 ($V_1$) and the voltage ($V_2$) generated by a voltage divider indicated generally at 97. Voltage divider 97 includes a pair of resistors 98 and 99 (R$_2$ and R$_3$) with a small adjustable potentiometer 99A between them. The resistors are connected in series between lines 65 and 62, and the line 90 is connected between the resistors 98 and 99. A reference voltage (V$_2$) is thus provided at a node 100 and one input of operational amplifier 96 is connected to node 100. A capacitor 101 is in turn connected between node 100 and circuit common 62. The operational amplifier 96 is powdered by the voltage on line 65, and the second input of amplifier 96 is connected to a junction 102 between a resistor 103 in line 94 and a resistor 104, which is a feedback resistor connected to the output of the operational amplifier 96. Resistors 103 and 104 are designated R$_4$ and R$_5$ and are substantially equal. The voltage at junction 102 is proportional to V$_1$.

The transmission gate 93 operates as a synchronous detector, and rectifies the voltage on the output side of buffer amplifier 92 which is coupled through capacitor 92A.

It is important to note that the voltage V$_1$ has a "pedestal" on it so that it never goes to zero even when C$_1$ equals C$_2$. C$_1$ approximately equal to C$_2$ is the zero condition for the differential pressure sensor, and the effect of the dielectric constant of the oil, which was discussed previously, in such sensors is compensated by the fact that V$_2$ will change with the dielectric constant, (V$_2$ depends the voltage on line 65) and as shown herein by adjusting the potentiometer 99A and thereby adjusting the effective values of resistors 98 and 99 (R$_2$ and R$_3$) the zero setting accounts for changes in the dielectric constant of the fill oil of the sensor sections in that the voltage on line 65 changes with density changes of oil fill. Adjusting to a zero output voltage on line 95 when the differential pressure being sensed by C$_1$ and C$_2$ is zero minimizes zero errors with temperature.

Figure 3:
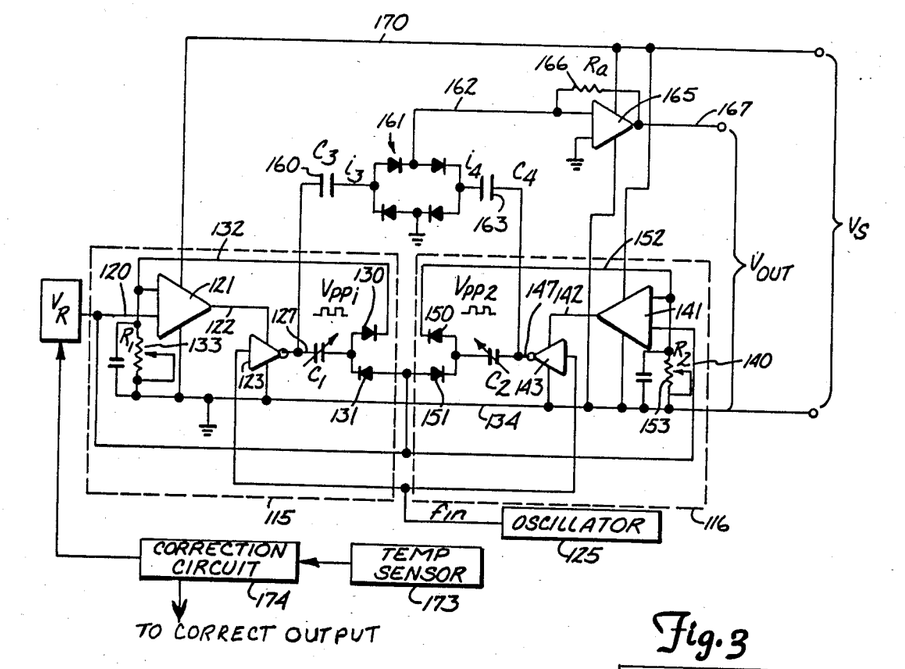
FIG. 3 is a modified form of the present invention showing a modified sensing circuit used for obtaining a usable output from a sensor such as that shown in FIG. 1.

The equations that explain the circuit of FIG. 3 are as follows:

$$i = K(C_A + C_s) V_{pp} f$$

$$iR_1 = V_R = K(C_A + C_s) V_{pp} f R_1 \ldots$$

$$V_{pp} = V_{DD} = \frac{V_R}{K(C_A + C_s) f R_1}$$

$$V_1 = \frac{V_{DD}}{2}\left(1 + \frac{C_2 - C_1}{C_2 + C_1}\right)$$

$$V_2 = V_{DD} \frac{R_3}{R_3 + R_2}$$

$$V_{out} = V_1 - V_2 = \frac{V_{DD}}{2} - V_{pp}\frac{R_3}{R_3 + R_2} +$$

$$\frac{V_{pp}}{2}\left(\frac{C_2 - C_1}{C_2 + C_1}\right) =$$

$$\frac{V_{DD}}{2}\left[\left(\frac{C_2 - C_1}{C_2 + C_1}\right) + \left(\frac{2R_3}{R_3 + R_2} - 1\right)\right]$$

$$V_{out} =$$

$$\frac{1}{2}\frac{V_R}{KfR_1} \frac{1}{C_A + C_s}\left[\frac{C_2 - C_1}{C_2 + C_1} - \left(\frac{2R_3}{R_3 + R_2} - 1\right)\right] \text{ and}$$

-continued $$\frac{1}{C_A + C_s} \propto \frac{e_o}{C_s}$$

if $C_A = C_s$ so for this case $$V_{out} \propto \frac{e_o}{C_s}(C_R - A)$$

The circuit components are identified in FIG. 3, and the "K" used in this analysis is the constant for the 4069 CMOS inverter 72. Frequency of course is the output of the crystal controlled oscillator 70.

V$_{out}$ is the signal between the output line 105 of the amplifier 96 and line 106, which is connected to node 100.

This output can then be used for a signal that is proportional to differential pressure after zeroing, and used in any desired manner, such as providing an input to a two-wire circuit, a three-wire circuit, or directly measured if necessary.

It should also be pointed out that V$_{DD}$ on line 65 varies as the dielectric constant of the fill oil in the sensor of FIG. 1 varies, and thus V$_2$ also varies as the dielectric constant varies to provide compensation.

Figure 4:
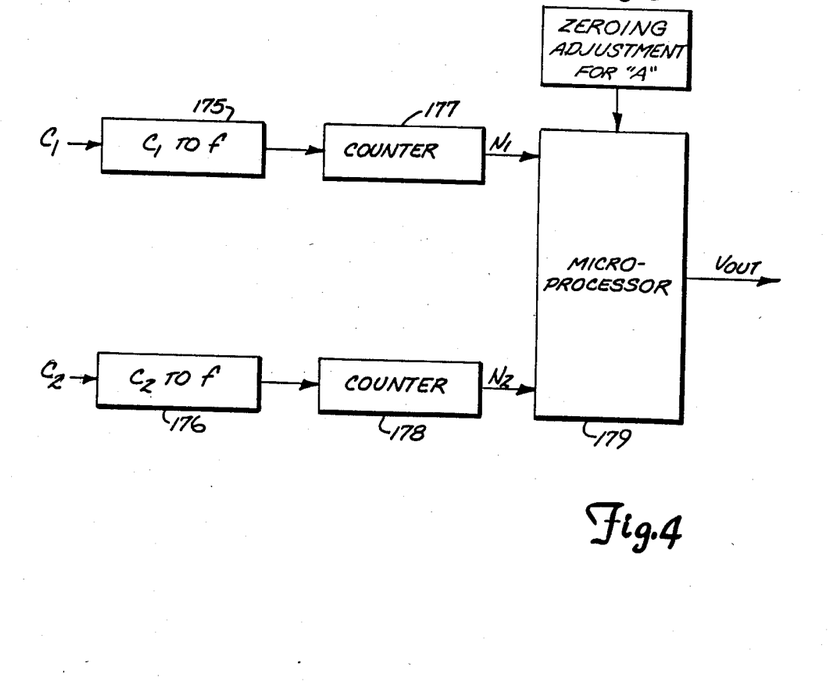
FIG. 4 is a simplified schematic representation of a digital system for providing an output.

FIG. 4 illustrates a circuit which provides a solution to the transfer function:

$$V_{out} = \left[\frac{K_1}{C_1} - \frac{K_2}{C_2}\right] \times V_R(T) = \frac{V_R(T)}{e}[K'_1 X_1 - K'_2 X_2]$$

which is essentially the equation (3) above if V$_R$(T) is made to vary in the same manner as e when the oil density changes as a function of temperature.

The circuit of FIG. 4 incorporates a circuit that varies the reference voltage as a function of temperature in the same manner that the dielectric constant varies with temperature. This could be accomplished by means of a temperature sensitive resistance bridge of the appropriate sensitivity used to establish V$_R$ in a conventional manner.

The circuit of FIG. 4 shows two identical oscillator product control loops (forming two controlled product oscillators from one basic oscillator input) that are utilized for providing the excitation to the sensing capacitors indicated at C$_1$ and C$_2$ in FIG. 4. A first oscillator product control loop 115 and a second oscillator product control loop 116 are enclosed within dashed lines. A voltage reference source (V$_R$) provides a reference voltage on a line 120 that feeds the first (inverting) input of an operational amplifier 121 which forms part of the first oscillator product control loop or circuit 15. Amplifier 121 is an oscillator output control amplifier. The product of an input signal from a standard oscillator is made dependent upon the output current through one of the sensing capacitors.

The output of the operational amplifier on line 122 is fed into a CMOS inverter 123 that has its input connected to an input oscillator 125, having a desired frequency (f$_{in}$). The inverter 123 acts as a switch to provide a square wave AC voltage that is proportional to the DC voltage output of the operational amplifier 121 on line 122. Line 127 carries the output from the inverter and is designated V$_{ppl}$.

This is the input to one side of the sensing capacitor C$_1$. The opposite side of capacitor C$_1$ is connected through a diode 130 to provide an output along line 132 to the second input of the operational amplifier 121, as well as to provide a current through resistance 133 (designated $R_1$) back to a circuit common line 134. A diode 131 is connected to conduit from a line 140, which is coupled to the voltage reference source $V_R$, to the output side of capacitor $C_1$.

The current through the capacitor $C_1$ is measured by resistance 133, ($R_1$) so that the $C_1$ current times $R_1$ which is the voltage at the second input to amplifier 121 is kept equal to the reference voltage $V_R$ by the control loop of operational amplifier 121. The oscillator product control loop or circuit 116 operates in the same manner as the loop 115, except that it is sensitive to the currents through capacitor $C_2$, which is the other side of the differential pressure sensing capacitor. Control loop or circuit 116 includes an operational amplifier 141 having one input connected to line 140, that is at the same voltage, $V_R$, as line 120, and the output from amplifier 141 on line 142 is connected to a CMOS inverter or switch 143. The input of the CMOS switch 143 is connected to input oscillator 125, and the output from switch 143 on a line 147 is a square wave output designated $V_{pp2}$, which is applied to capacitor $C_2$. The output side of capacitor $C_2$ is connected through diode 150 to a line 152, and the current in line 152 is passed through a resistor 153 ($R_2$) to the circuit common line 134. The second input of the operational amplifier 141 is also connected to sense the voltage on line 152 as determined by the current in line 152 and resistor 153.

A diode 151 is connected to conduct from line 140 to the output side of capacitor $C_2$, as well.

The diodes 130, 131, and 150, 151 form a network that requires close tracking diodes, and by adjusting the voltages on lines 122 and 142 the output voltages $V_{pp1}$ and $V_{pp2}$ are controlled by the value of the variable capacitors $C_1$ and $C_2$.

The output of inverter or switch 123 on line 127 is connected to the one side of a capacitor 160, ($C_3$) and the output side of capacitor 160 is connected though a diode network 161 to a line 162.

Line 147, which comprises the output of CMOS switch 143, is connected to one side of a capacitor 163, and the output of capacitor $C_4$ is connected from another side of the diode network 161 so that the currents $I_3$ from $C_3$ and $I_4$ from $C_4$ are subtracted and the difference is provided on a line 162 which leads to a first input of an operational amplifier 165. A resistor 166 is connected between the line 162 and the output of the operational amplifier 165, and the other input terminal of operational amplifier 165 is connected to circuit common.

A suitable voltage source designated $V_S$ is provided between the input voltage line 170 and the circuit common line 134 to provide power for the operational amplifier at a suitable voltage level.

The voltage output from the operational amplifier 165, along the line 167, is a function of the capacitance values of $C_1$ and $C_2$, respectively, and thus an output which is a function of the parameter sensed by these capacitors, as shown in FIG. 1, differential pressure.

The equations which govern the operation of this circuit of FIG. 4 are as follows:

$$f_{in}V_{pp1}C_1R_1 = V_R$$

$$f_{in}V_{pp2}C_2R_2 = V_R$$

The above equations define the reference voltage in terms of the voltage that is on the output side of inverters or switches 123 and 143, respectively.

In the above equations, $f_{in}$ is the frequency of the oscillator 125, and the other elements are labeled in FIG. 4.

The output voltage equations are as follows:

$$V_{out} = (i_3 - i_4) R_{out} = R_{out} (F_{in}V_{pp1}C_3 - F_{in}V_{pp2}C_4)$$

$$= R_{out}\left(\frac{V_R}{R_1C_1} C_3 - \frac{V_RC_4}{R_2C_2}\right)$$

$$= R_{out} V_R\left[\frac{C_3}{R_1}\left(\frac{1}{C_1}\right) - \frac{C_4}{R_2}\left(\frac{1}{C_2}\right)\right]$$

It has been shown that the capacitances of the sensor elements of FIG. 1 are a function of the oil dielectric constant and the spacing of the capacitor plates, thus:

$$C_1 = \frac{K_1 e}{X_1} \text{ and } C_2 = \frac{K_2 e}{X_2}$$

$$= R_{out} V_R\left(\frac{C_3}{R_1} \frac{X_1}{K_1 e} - \frac{C_4}{R_2} \frac{X_2}{K_2 e}\right)$$

$$V_{out} = \frac{R_{out} V_R}{e}\left[\left(\frac{C_3}{R_1 K_1}\right) X_1 - \left(\frac{C_4}{R_2 K_2}\right) X_2\right]$$

In the above equations, it must be noted that output is a function of the oil dielectric constant (e). Thus temperature compensation is provided by separately sensing the temperature with a temperature sensor 173 and providing a correction voltage factor from a correction or compensation circuit 174 for $V_R$. Alternately, the correction voltage factor from circuit 174 can be scaled to compensate $V_{out}$. The compensation circuit may be analog or digital and will provide the compensation voltage as a function of the known relationship between temperature and oil density and dielectric for the fill oil.

Figure 5:
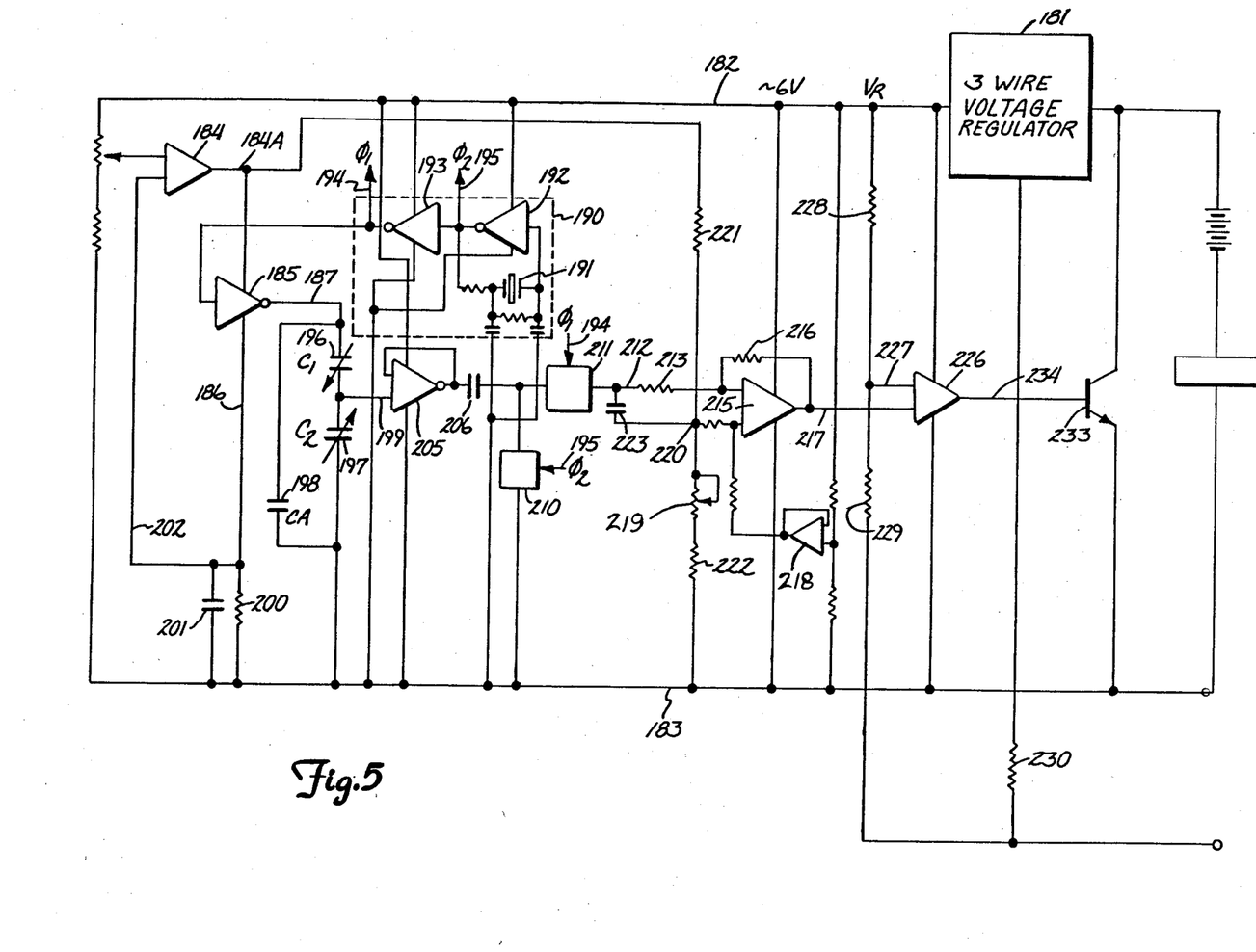
FIG. 5 is a schematic representation of a typical two wire circuit providing a DC current output as an indication of sensor parameter utilizing the sensing circuit substantially similar to that shown in FIG. 2.

Referring to FIG. 5, a simplified schematic drawing for implementing the desired transfer functions through the use of digital techniques is illustrated. The output digital number representing pressure is derived digitally by implementation of the same transfer functions as previously described wherein a zero adjustment is made and the resultant quantity is corrected for span errors with a correction term.

As shown in FIG. 5, capacitances $C_1$ and $C_2$ from the respective sensor portion of a differential pressure sensor such as that shown in FIG. 1, are measured by capacitance-to-frequency circuits 175 and 176, respectively. Capacitance-to-frequency circuits are well known, and may comprise an output frequency of an oscillator, for example, which is dependent upon a capacitive load $C_1$ and $C_2$, respectively.

Additionally, a capacitance-to-frequency circuit is disclosed in U.S. Pat. No. 4,391,146 issued to Grindheim on July 5, 1983. U.S. Pat. No. 4,391,146 shows a frequency output that is inversely proportional to the square root of capacitance. A direct representation of capacitance could thus be computed in the microcomputer by calculating new numbers $N'_1$ and $N'_2$ where $$N'_1 = \frac{1}{N_1^2} \alpha C_1 \text{ and } N'_2 = \frac{1}{N_2^2} \alpha C_2.$$

$N_1'$ and $N_2'$ would then be processed as described below.

Capacitance-to-frequency circuits 175 and 176 are in turn connected to separate digital counters indicated at 177 and 178, respectively, that provide an output digital number designated $N_1$ and $N_2$ on output lines which are fed into a microprocessor 179. The microprocessor is a conventional microprocessor that is capable of forming multiplication, division, and like functions in a conventional manner and it then combines the numbers representing capacitances $C_1$ and $C_2$ ($N_1$ and $N_2$, respectively) to provide an output function as follows:

$$N_{out} = \frac{1}{\sqrt{\frac{N_1 N_2}{N_1 + N_2}}} \left[ \frac{N_1 - N_2}{N_1 + N_2} - A \right]$$

$$= \frac{1}{\sqrt{\frac{C_1 C_2}{C_1 + C_2}}} \left[ \frac{C_1 - C_2}{C_1 + C_2} - A \right]$$

$$= \frac{1}{\sqrt{C_s}} \left[ \frac{C_1 - C_2}{C_1 + C_2} - A \right]$$

This transfer function then directly provides an output that can be calculated simply in a microprocessor to provide a temperature stable output similar to that which has been done with analog circuits shown above. The capacitances, of course, would be suitably excited for obtaining an indication of capacitance change as the diaphragms deflect, with the capacitance-to-frequency circuits. The first term of the above equation is a function of $C_s$ and thus of fill oil density (temperature correction) and the second term is a function of differential capacitance and thus differential pressure with a zeroing constant A.

It can be seen that the transfer function output from the microprocessor in digital form corresponds to one form of the function $Z_4$. The span correction term ($F_1$) times a function ($F_2$) of differential pressure expressed as capacitor values and a zeroing constant A is the microprocessor output.

A more general digital function that is implemented mathematically would include the situation where the function of temperature, which as shown in FIG. 5 is calculated from $N_1$ and $N_2$ which represent $C_1$ and $C_2$ values, can be supplied by a separate temperature sensor similar to that shown in FIG. 4. Temperature would be provided with a digital number and the microprocessor would provide an output as follows:

$$N_{out} = N_3(T) \left[ \frac{N_1 - N_2}{N_1 + N_2} - A \right]$$

where $N_3(T)$ is a number derived measuring the temperature, $N_1$ and $N_2$ are the numbers representing the capacitance values of $C_1$ and $C_2$, respectively, and A is a zeroing constant, as it is above.

The constant A is subtracted out in the microprocessor and is adjusted or scaled for the zero setting at zero differential pressure.

$N_{out}$ may be used directly or may drive a digital to analog converter to provide a voltage signal ($V_{out}$) for driving a load, such as a recorder, or for any other desired use.

In FIG. 5, a capacitance sensing circuitry similar to that shown in FIG. 2, but designed for use in a two-wire circuait, wherein the current carried in the two wires to a remote source and load represents not only the value of the parameter being measured, but also provides the power for powering the sensing and transmitter circuit.

In FIG. 5, many components are substantially identical to those in FIG. 2, with the addition of current control circuitry and providing a voltage reference source specifically powdered through the two-wire circuit.

As shown, the two-wire circuit has a pair of terminals 180 and 181, respectively. These terminals will be connected in series with a remote source of power and load as shown. The voltage provided will be between 12 and 24 volts in the usual system, and terminal 180 is connected to a voltage regulator 181A of conventional design that, in accordance with known two-wire circuit design provides a reference voltage $V_R$ along the line 182. The reference voltage is with respect to a circuit common or return line 183.

The reference voltage is provided to one input of an operational amplifier 184 to provide the drive voltage to a type 4069 CMOS inverter or gate 185, which has the characteristics that the current that it drives in a line 186 from the inverter is proportional to the capacitive load on the output line 187 of the inverter. A line 184A connects the output of the operational amplifier 184 to the inverter 185. The current in line 186 is sensed to provide a control signal to the operational amplifier 184.

In this form of the invention, the crystal-controlled oscillator outlined generally in the dotted lines 190 includes a suitable control crystal 191 that provides signals to a pair of Schmidt triggers (40106 Schmidt triggers) indicated generally at 192 and 193, respectively, which are connected to provide output signals $\phi_1$ and $\phi_2$ (two different phase signals) in a square waveform through connections shown at 194 and 195, respectively. The output of the Schmidt trigger 193 carrying signal $\phi_1$ is connected to the input of the inverter 185 and inverter 185 is driven to provide an AC excitation signal that is carried on the line 187, and which is used to excite capacitors designated $C_1$ and $C_2$. These are the sensing capacitors, as shown differential pressure sensors, and are numbered 196 and 197, repectively. The capacitors are connected in series shown from line 187 to the circuit common line 183. A capacitor 198 ($C_A$) is connected in parallel across capacitors 196 and 197. An output line 199 from the series connected capacitors is connected between the capacitors as shown.

The line 186 is connected through a resistor ($R_1$) indicated at 200 to the circuit common line 183, and a parallel connected capacitance 201 is provided from a line 202 which connects to the line 186 and also to the second input of the operational amplifier 184. The operational amplifier 184 thus provides an output voltage on its output line 184A, that is a function of the differential signals at its inputs, including, therefore, a function of the reference voltage sensed at one input and the voltage on the line 202, which in turn is a function of the current flowing through the line 186 and resistor 200. As previously explained, this current change provides for a correction factor which is a function of the series capacitance of $C_1$ and $C_2$, or in other words, the capacitive load on the inverter 185.

The output signal on line 199 is a capacitance signal which is proportional to the difference of the capacitances between $C_1$ and $C_2$, and this output signal, which is an AC signal, is fed into an input of a high impedance AC buffer amplifier 205 which is suitably powered with lines (not shown) from the reference voltage in line 182 and return line 183. The output of buffer amplifier 205 is an AC signal that is passed through a capacitor 206 into the inputs of two CMOS transmission gates. Each of these gates is one-fourth (¼) of a 4016 of CMOS gate, and a first gate 210 has its output connected to the circuit common line 183, and a second of the gates 211 has its output connected to an output line 212. The gate 210 is triggered on signal $\phi_2$ from line 195, and the gate 211 is triggered from the signal $\phi_1$ on line 194.

The gates provide a rectified voltage $V_1$ on line 212. A resistor 213 is connected in line 212 and in turn this line then is connected to an input of an operational amplifier 215. The operational amplifier has a suitable feedback resistor 216 connected between its output line 217 and line 212. The second input of operational amplifier 215 is connected through a resistor to a node 220 formed by a voltage divider network comprising two resistors 221 and 222 which are connected in series across lines 184A and 183. The second input of amplifier 215 is connected through a resistor to the output of an amplifier 218 which is connected to maintain virtual ground potential on its output. To stabilize the amplifier 215, in that the node 220 is connected to the excitation voltage line 184A, which changes with changes in capacitance. The node 220 also is coupled through a capacitor 223 back to the line 212 at the output of the transmission gate 211. The output on line 217 from the operational amplifier 215 is a DC signal that represents the differential value of the capacitance $C_1$ and $C_2$. Zero adjustment can be provided in the same manner as that shown in FIG. 2, by providing a small adjustable resistor 219 in series with the resistances 221 and 222, and the resistors 221 and 222 comprise $R_2$ and $R_3$, resistor 213 comprises $R_4$ and resistor 216 comprises $R_5$ in the previous analysis in relation to FIG. 2.

In order to provide for a precise current control through the terminals 180 and 181 and to provide an output current that is proportional to the parameter being sensed by the capacitors $C_1$ and $C_2$, the DC signal on line 217 is connected to one input of a current control operational amplifier 226. Operational amplifier 226 is also powered from lines 182 and 183 as shown, and has its second input connected with a line 227 between a pair of resistors 228 and 229 which are connected in series from the line 182 to the output terminal 181.

The resistances 228 and 229 are part of a resistance network which includes a feedback resistor 230, which is connected to terminal 181 and also to the emitter of a transistor 233.

The output signal from the current control amplifier 226 along a line 234 is connected to the base of transistor 233. Transistor 233 acts as a current amplifier and has its collector connected to the terminal 180 and as stated, its emitter is connected through the feedback resistor 230 to the terminal 181. The current flowing through the transistor 233 is proportional to the signal on line 234 at its base, and this signal on line 234 in turn is a function of the DC signal on line 217 that depends upon the values of $C_1$ and $C_2$, and of the signal on line 227, which is dependent upon the voltage in the resistance network comprising resistors 228, 229 and 230. This voltage, as can be seen, is dependent upon the current flowing through the resistance network including resistor 230, as well as resistors 228 and 229. As the output from the capacitors $C_1$ and $C_2$ changes, the voltage on line 217 will change, causing the current control amplifier to adjust the current through the transistor 233 and through the feedback resistor 230 which will in turn cause a change in the voltage at line 227 in a sense that will tend to achieve a balance of the signals at the input of the current control amplifier 226, thus controlling the signal on line 234 at a level providing sufficient current to achieve this balance.

In this way, a two-wire current control is derived which provides a current flow between terminals 180 and 181 that is a known function of the difference signal of capacitances $C_1$ and $C_2$.

A 4–20 ma signal is a typical output signal, and 4 ma is sufficient to power the voltage regulator 181A as well as the other components of the transmitter circuit shown in FIG. 6

Again, the capacitive analysis previously set forth shows the operation, and an output signal that is corrected for zero and span errors is achieved in a two-wire circuit.

The sensors of the type described in FIG. 1 may be constructed with one deflecting diaphragm in each sensor portion, which is mounted as a rigid base, such as that shown in the copending U.S. patent application of Thomas A. Knecht et al referred to in the introductory portion of this specification. To carry out the features of the invention the output voltage or number is from circuit means for providing $F_1 \cdot F_2(C_1;C_2)$. $F_1$ is the compensation term related to oil density that may be obtained by measuring the temperature or by deriving the term from the capacitances of the sensor portion, for example a function of series capacitance. $F_2(C_1;C_2)$ is a function of $C_1$ and $C_2$ which is chosen to provide a desired relationship between the output and differential pressure and is adjusted to have a zero value when $\Delta p = 0$. The embodiment disclosed provides an output from these functions which is stable and is not dependent on exact matches in characteristics of the deflecting diaphragms.

Although the present invention has been described with reference to preferred embodiments, workers skilled in the art will recognize that changes may be made in form and detail without departing from the spirit and scope of the invention.

What is claimed is:

1. For use in combination with a differential pressure sensor assembly comprising first and second sensor sections each having a separate deflecting diaphragm mounted with respect to a sensor surface and initially substantially contiguous with such surface and capable of deflecting with respect to the surface to form separate internal chambers for each sensor section, means fluidly connecting the internal chambers, a quantity of substantially noncompressible fluid filling said chambers and said means fluidly connecting to bow the diaphragm relative to the respective sensor surface, whereby movement of one diaphragm in direction to reduce the volume of its associated internal chamber results in movement of the other diaphragm in direction to increase the volume of its internal chamber, means on the respective diaphragms and on the respective sensor surfaces for forming first and second sensing capacitors which vary in opposite sense as a function of differential changes in pressures acting on the diaphragms, the improvement comprising means for providing an output signal from such a pressure sensor assembly representing differentials in pressure acting on the diaphragms of the sensor elements of such a pressure sensor assembly including:

means for sensing the capacitance values of the first and second sensing capacitors of such a sensor; and means associated with such a sensor assembly for providing a signal $F_1$ representing a change in density of the noncompressible fluid filling the internal chambers of such a pressure sensor assembly, and also coupled to the means for sensing for providing a signal $F_2$ which is a function of the capacitances of the first and second capacitors of such a pressure sensor assembly and thus of the differential pressure on the sensor elements thereof, and which signal $F_2$ is substantially zero when the sensed differential pressure is substantially zero, and for multiplying the signals $F_1$ and $F_2$ to provide the output signal.

2. The apparatus of claim 1 wherein the last mentioned means includes temperature sensor means for measuring the temperature of such a pressure sensing assembly for providing the signal $F_1$.

3. The apparatus of claim 1 wherein the last mentioned means includes means coupled to the means for sensing for providing the signal $F_1$ as a function of the capacitances of both the first and second sensing capacitors.

4. The apparatus of claim 3 wherein last mentioned means comprises means to provide the signal $F_1$ as a function of the quantity $$\frac{C_1 C_2}{C_1 + C_2} = C_s$$

with the quantities $C_1$ and $C_2$ being the capacitance values represented by signals from the means for sensing.

5. The apparatus of claim 4 wherein the means for sensing further includes means to couple the first and second capacitors in series and means to sense a capacitance $C_A$ coupled in parallel with the series connection of the first and second capacitors, said last mentioned means providing a signal $$F_1 = \frac{K}{C_A + C_s}$$

wherein K is a constant and $C_A$ is substantially equal to $C_s$.

6. The apparatus of claim 1 wherein the last mentioned means includes means for providing the signal $$F_2 = \frac{C_1 - C_2}{C_1 + C_2} - A$$

where the quantities $C_1$ and $C_2$ are the outputs of the means to sense the first and second capacitors and A is a constant.

7. The apparatus of claim 1 wherein the last mentioned means includes means for providing the signal $$F_2 = \frac{K_1}{C_1} - \frac{K_2}{C_2}$$

where the quantities $C_1$ and $C_2$ are the outputs of the means to sense the first and second capacitors and $K_1$ and $K_2$ are constants.

8. The apparatus of claim 1 wherein said means for sensing comprises means for deriving a digital value corresponding to the value of the capacitance of each of the first and second capacitors, said last mentioned means comprising a digital processor for providing the output signal as a function of calculated values of $F_1$ and $F_2$.

9. The apparatus of claim 1 wherein said last mentined means includes first circuit means for providing an excitation signal for said means to sense and second zeroing circuit means for providing a zeroing signal, said first circuit means also providing excitation for said zeroing circuit means, said zeroing circuit means being coupled to the means for sensing to provide the $F_2$ signal.

10. The circuit of claim 9 wherein said excitation means comprises switching means providing output signals to excite the first and second capacitors of such a pressure sensor assembly.

11. The apparatus of claim 10 wherein the excitation means comprises a separate switching means for each of the first and second sensor capacitors of such a pressure sensor assembly, separate feedback resistance means, separate diode network means adapted to be coupled to each sensor capacitor, respectively, for providing the output current of each sensor capacitor to one of the separate feedback resistance means, the reference voltage signal means and the respective feedback resistance means being coupled to separate amplifier means which adjust the voltage powering the respective switching means to provide an output of each such inverter which varies as a function of the capacitive load thereon.

12. The apparatus of claim 10 wherein said excitation means comprise separate controlled product oscillator means for each of the first and second capacitors.

13. The apparatus of claim 1 wherein said last mentioned means includes excitation means for said means to sense, said excitation means comprising a reference voltage signal, and means for varying the reference voltage signal as a function of temperature dependent change in density of the fluid filling the interior chambers of a pressure sensor assmbly being sensed.

14. A measuring circuit for use in combination with a differential pressure sensor assembly comprising first and second sensor sections each having a separate deflecting diaphragm mounted with respect to a sensor surface to initially be substantially contiguous therewith and forming a separate internal chamber for each sensor section, means fluidly connecting the internal chambers and a quantity of substantially noncompressible fluid filling said chambers and said means fluidly connecting to bow the diaphragms away from their respective surface, whereby movement of one diaphragm in direction to reduce the volume of its associated chamber results in movement of the other diaphragm in direction to increase the volume of its chamber, means on the respective diaphragms and on the respective sensor section surfaces for forming first and second sensing capacitors which vary in opposite sense as a function of differences in pressure acting on the diaphragms, said circuit providing an output indicating the differential pressure value, and including excitation means for providing an excitation signal to each of said first and second capacitors of such sensor, means for sensing the capacitance of such first and second capacitors and for adjusting the excitation signal from the excitation means as a function of the capacitance of said first and second capacitors, detection circuit means coupled to the output of such first and second capacitors to provide a variable signal which is a function of the capacitance, zeroing circuit means connected to the excitation means and to the detection circuit means, said zeroing circuit including means for adjusting the voltage output signal to be zero when the first and second diaphragms are sensing equal pressures.

15. The measuring circuit of claim 14 wherein means for deriving a reference voltage includes means for adjusting the reference voltage as a function of the series capacitance of the first and second sensing capacitors.

16. The measuring circuit of claim 15 including a pair of wires adapted to be connected to a power source and load, current control circuitry means connected for receiving said output voltage signal from the zeroing circuit and for controlling current flow through said two wires, said current control circuitry means including an amplifier receiving said voltage output signal, and a feedback resistor coupled to the amplifier for adjusting the amplifier output as a function of the current flow through the two wires, each of the components of said output circuit being powered from current flowing through said two wires.

17. The measuring circuit of claim 14 wherein the means to sense the capacitance of such first and second capacitors to adjust the excitation means comprises a feedback resistance means for providing feedback voltage signals which represent the values of the first and second capacitors, means for providing a reference voltage signal, and amplifier means adjusting the excitation signal in response to differences between the feedback voltage signal and the reference voltage signal.

18. The measuring circuit of claim 14 wherein the excitation means comprises a CMOS inverter having its output coupled to drive the first and second sensor capacitors in series, said inverter providing a current signal as a function of the capacitive load on its output.

19. The output circuit of claim 14 wherein said zeroing circuit means comprises a resistance network, an amplifier coupled to said resistance network, said resistance network providing a first voltage which is a function of the excitation signal, and providing a second voltage signal to said amplifier which is a function of the difference in capacitance of the first and second capacitors.

20. The apparatus as specified in claim 19 wherein said resistance network comprises first and second resistors forming a voltage divider for providing said first voltage as a reference voltage which varies as a function of said excitation signal to a first input of said amplifier, and said means for providing the second voltage signal includes a third resistor connected to the second input of the amplifier, and a fourth resistor comprising an amplifier feedback resistor connected from the output of the amplifier to said second input.

21. A circuit for use with a differential pressure sensor having first and second sensing capacitors which include deflecting diaphragms supported by a noncompressible fluid which is common to both diaphragms and wherein the sensing capacitors are at substantially zero setting when the pressure of the noncompressible fluid is zero, at least one of said sensing capacitors varying in response to pressure, said circuit including having means for exciting said sensing capacitors in series, means coupled to the capacitors to provide an output representing the quantity $$\frac{C_1 - C_2}{C_1 + C_2} - A$$

wherein $C_1$ and $C_2$ represent the capacitance values of the first and second sensing capacitors, respectively, and means for providing a correction signal to the means for exciting the capacitors, said correction signal being a function of the series capacitance of the first and second sensing capacitors.

22. The circuit of claim 21 wherein said means to provide a correction signal provides a signal substantially a function of $$C_s = \frac{C_1 C_2}{C_1 + C_2},$$

where $C_s$ is the series capacitance and $C_1$ and $C_2$ are the capacitances of first and second sensing capacitors, respectively.

23. The apparatus as specified in claim 22, said sensing capacitors being formed on facing surfaces of chambers formed in part by the deflecting diaphragm, a passageway fluidly connecting said separate chambers, said chambers and said passageway being filled with the substantially incompressible fluid.

24. The circuit of claim 21 wherein the means coupled to the capacitors comprises an AC amplifier, demodulation means coupled to the AC amplifier for providing a DC voltage signal representing the magnitude of the output signal from the sensing capacitors, and a resistance network for receiving a voltage varying as a function of the correction signal and combining such voltage with the DC voltage signal.

* * * * *

UNITED STATES PATENT AND TRADEMARK OFFICE
CERTIFICATE OF CORRECTION

PATENT NO. : 4,586,108

DATED : April 29, 1986

INVENTOR(S) : Roger L. Frick

It is certified that error appears in the above-identified patent and that said Letters Patent is hereby corrected as shown below:

In column 3, line 32, the word "utilized" should read --utilizable--.

In column 4, line 32, the word "saphire" should read --sapphire--.

In column 5, line 12, "lead 29" should read --lead 28--.

In column 6, line 1, the word "described" should read --describe--.

In column 6, line 2, the word "plate" should read --plates--.

In column 10, line 5, the word "coeeficient" should read --coefficient--

In column 11, line 37, the word "here" should read --there--.

In column 11, line 55, the word "sucb" should read --such--.

In column 11, line 67, the word "osciallator" should read --oscillator--.

UNITED STATES PATENT AND TRADEMARK OFFICE
CERTIFICATE OF CORRECTION

PATENT NO. : 4,586,108

DATED : April 29, 1986

INVENTOR(S) : Roger L. Frick

It is certified that error appears in the above-identified patent and that said Letters Patent is hereby corrected as shown below:

In column 12, line 2, the word "typwe" should read —type—.

In column 12, line 4, "line 76 is proportional" should read —line 76 is directly proportional—.

In column 12, line 18, the word "oF" should read —of—.

In column 12, line 31, "A zeroing" should have started a new paragraph.

In column 13, line 10, the word "powdered" should read —powered—.

In column 18, line 10, the word "circuait" should read —circuit—.

In column 18, line 17, the word "powdered" should read —powered—.

In column 22, line 15, the word "mentined" should read —mentioned—.

In column 22, line 50, the word "assmbly" should read —assembly—.

Signed and Sealed this

Fourteenth Day of October, 1986

[SEAL]

*Attest:*

DONALD J. QUIGG

*Attesting Officer*     *Commissioner of Patents and Trademarks*